United States Patent [19]

Shiomi

[11] Patent Number: 5,047,793

[45] Date of Patent: Sep. 10, 1991

[54] AUTOMATIC RANGE FINDER CAMERA SYSTEM WITH A REMOTE CONTROL FUNCTION

[75] Inventor: Yasuhiko Shiomi, Tokyo, Japan

[73] Assignee: Canon Kabushiki Kaisha, Tokyo, Japan

[21] Appl. No.: 537,144

[22] Filed: Jun. 12, 1990

Related U.S. Application Data

[63] Continuation of Ser. No. 500,098, Mar. 21, 1990, abandoned, which is a continuation of Ser. No. 420,735, Oct. 12, 1989, abandoned, which is a continuation of Ser. No. 259,412, Oct. 18, 1988, abandoned, which is a continuation of Ser. No. 188,068, Apr. 27, 1988, abandoned, which is a continuation of Ser. No. 945,896, Dec. 24, 1986, abandoned.

[30] Foreign Application Priority Data

Dec. 26, 1985 [JP] Japan .................. 60-296664
Dec. 26, 1985 [JP] Japan .................. 60-296665
Dec. 26, 1985 [JP] Japan .................. 60-296666

[51] Int. Cl.[5] .................. G03B 9/64; G03B 17/38; G03B 17/40

[52] U.S. Cl. .................. 354/238.1; 354/266; 354/268

[58] Field of Search .................. 354/400–403, 354/237, 238.1, 266, 268, 412, 430, 131; 358/105

[56] References Cited

U.S. PATENT DOCUMENTS 4,445,767 5/1984 Kawazoe .................. 354/266
4,636,054 4/1987 Saegusa .................. 354/432

FOREIGN PATENT DOCUMENTS 62-86337 4/1987 Japan .

Primary Examiner—W. B. Perkey
Attorney, Agent, or Firm—Fitzpatrick, Cella, Harper & Scinto

[57] ABSTRACT

There is disclosed camera system comprising: unit for automatically and repeatedly measuring the distance to an object; unit for discriminating the measured results on the basis of the measured results, to provide a predetermined activation signal; and exposure control unit for performing exposure operation in response to the activation signal.

66 Claims, 7 Drawing Sheets

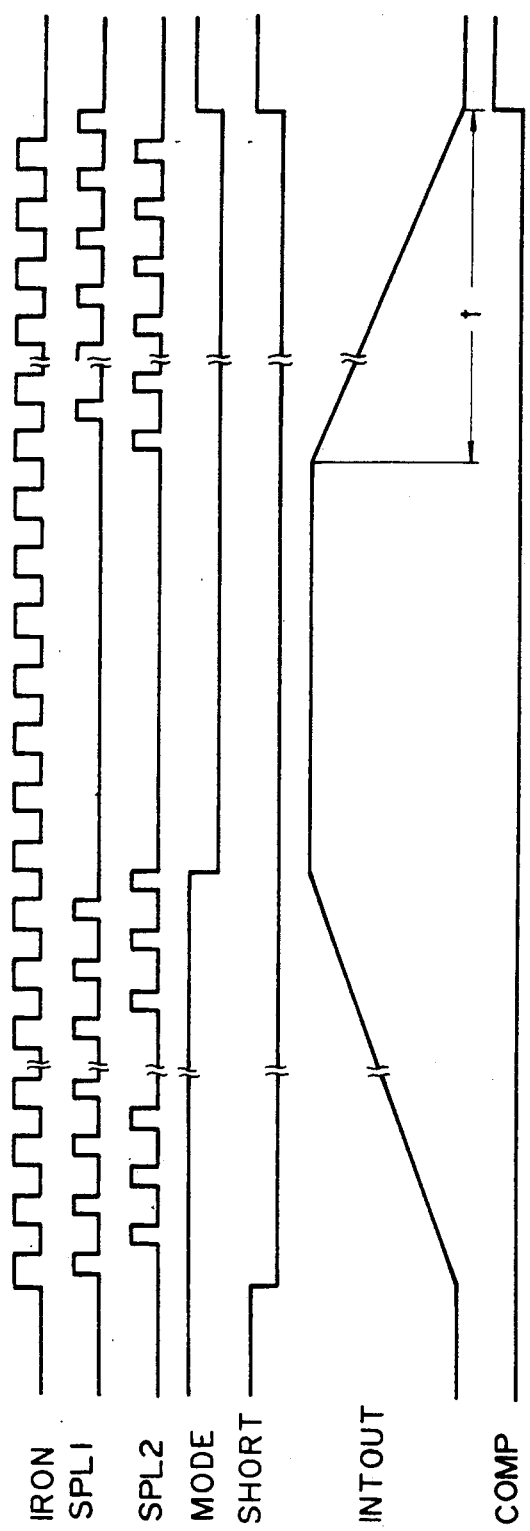

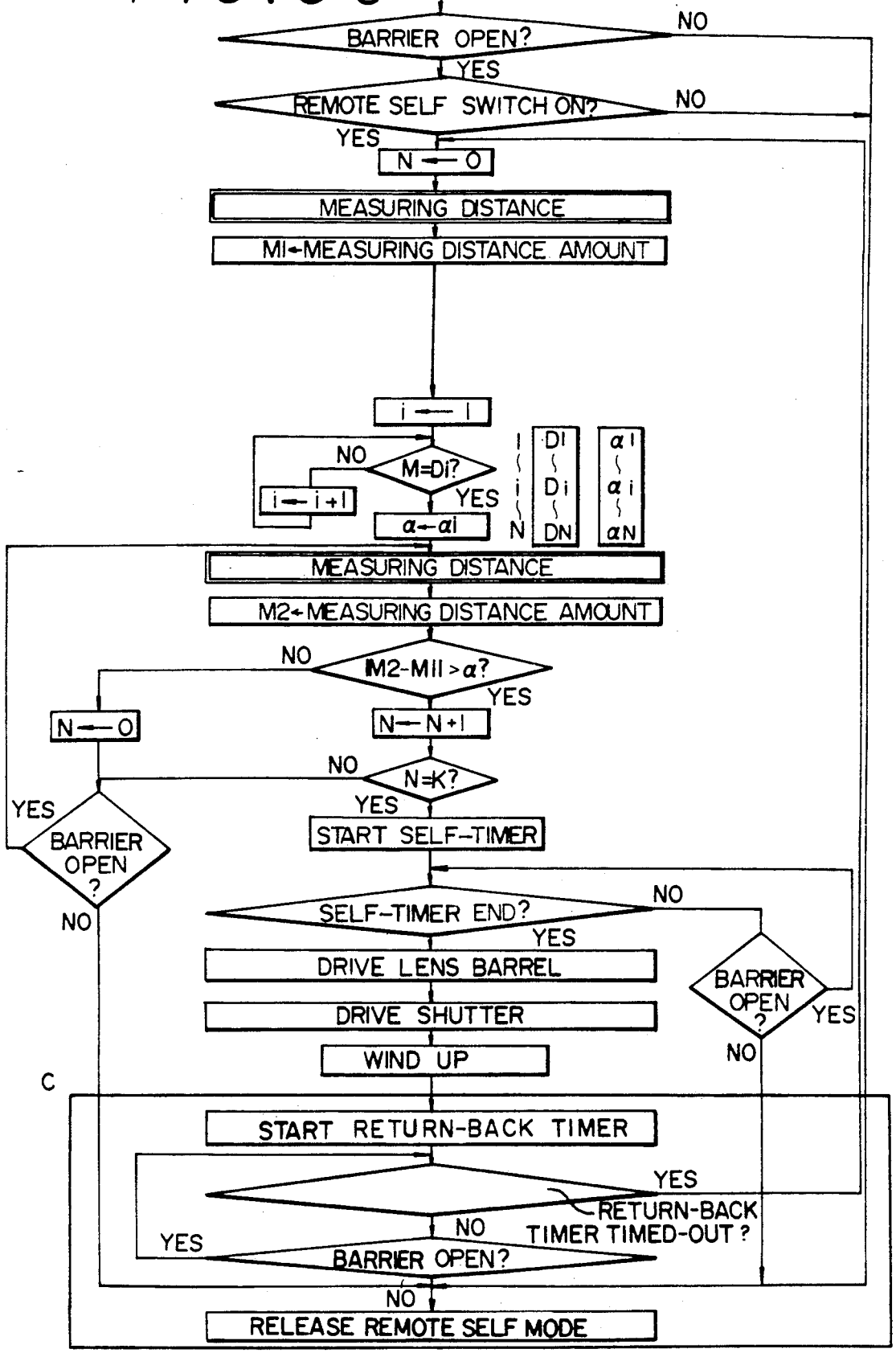

AUTOMATIC RANGE FINDER CAMERA SYSTEM WITH A REMOTE CONTROL FUNCTION

This application is a continuation-in-part of application Ser. No. 500,098 filed Mar. 21, 1990, which is a continuation of application Ser. No. 420,735, filed Oct. 12, 1989, which is a continuation of Ser. No. 259,412, filed Oct. 18, 1988, which is a continuation of application Ser. No. 188,068, filed Apr. 27, 1988, which is a continuation of Ser. No. 945,896, filed Dec. 24, 1986, all now abandoned.

BACKGROUND OF THE INVENTION

1. Field of the Invention

The present invention relates to a camera system, and more particularly to a camera system having an automatic range finder with a remote control unit.

2. Related Background Art

Cameras recently manufactured contain automatic exposure function, automatic focusing function or automatic light intensity control function and the camera has high performancy.

Further, the camera has high performance, nevertheless, the camera may have small size and light weight.

A camera, in order to perform the remote operation of the camera, a camera provided with a remote control unit (hereinafter referred as "remocon") is proposed.

However, in the conventional camera with a "remocon", since at least a transmitter thereof is separate from a camera body and a receiver is mounted in the camera body separately from other devices in the camera body (for example, automatic exposure device and automatic focusing device), when a camera has a remocon even in the above camera having high performance and small size, a total volume of the remote control unit and the camera body is fairly large by the provision of the remocon. As a result, transportability is low, manufacturing cost is high, and when the remote control transmitter is lost or broken, remote control photographing is not attained.

SUMMARY OF THE INVENTION

It is a first object of the present invention to provide a camera system which resolves the problems encountered in the prior art camera with remote control unit and which contains a compact, portable and high performance remote control transmitter/receiver in a camera body.

To this end, the present invention provides a camera system in which a transmitter/receiver of an automatic range finder contained in a camera body is common to a transmitter/receiver of a remote control unit and exposure is made in response to a predetermined amount of change in the result of the range finding by the automatic range finder. That is to say, the camera has a range finder with a transmitter/receiver mounted in a camera body so that the remote control is attained simultaneously with the automatic range finding, and the range finder information can be manually changed by an operator of the camera system and the self-timer mode photographing can be automatically started. Accordingly, the operator need not carry the remote control transmitter to conduct the remote control photographing.

It is a second object of the present invention to provide a camera system which prevents releasing when a photographer does not wish so that wasteful photographing is prevented.

To this end, a camera according to the present invention measures a distance by an automatic range finder at least twice in the self-timer mode photographing and prevents releasing when the distance measured immediately after the self-timer operation and the distance measured before the self-timer operation are different. In the above arrangement, when a photographer does not desire, for example, immediately after some one has intersected the camera, the release operation is inhibited to prevent the occurence of the error photograph.

It is the third object of the present invention to improve the operability in sequential photographs in the above camera system.

To this end, in the present invention a closed loop operation is sequentially performed in the above remote control operation, and, a stop period is set in said closed loop operation every one photograph, so that said remote control operation is sequentially performed, and the stop of the above remote control operation is easily executed in the stop period.

Further objects and the other points become clear in the explanations of embodiments described hereinafter.

BRIEF DESCRIPTION OF THE DRAWINGS

FIG. 2 shows a timing chart for a control signal and other signals in the circuits shown in FIG. 1, FIG. 3 shows a flow chart of a control sequence for the camera system, FIG. 3C shows a flow chart of the range finder sequence in a further embodiment of the camera system.

DESCRIPTION OF THE PREFERRED EMBODIMENTS

Embodiments of the present invention will now be explained with reference to the drawings.

Figure 1:
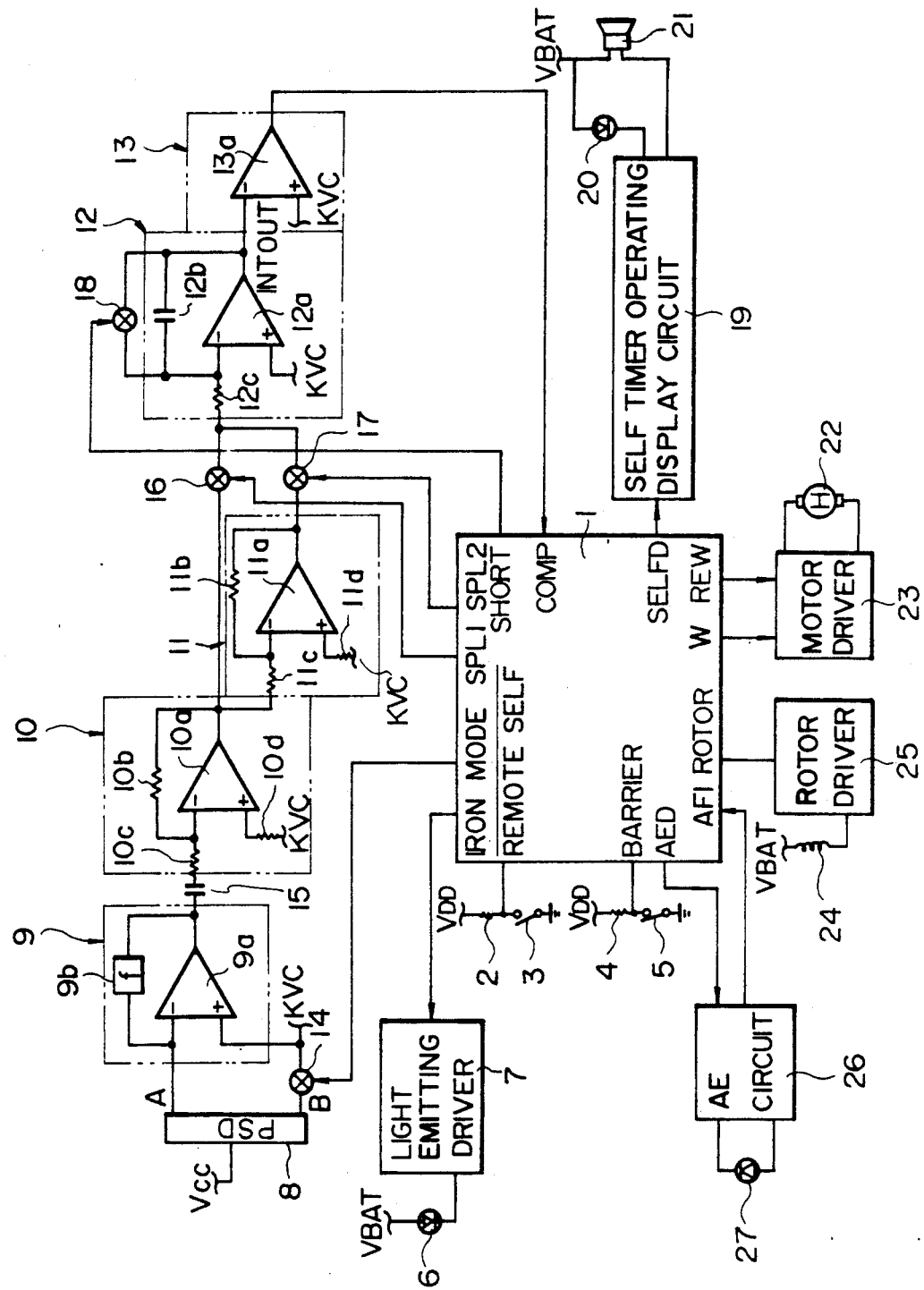
FIG. 1 shows measurement and control circuits of a present camera system.

FIG. 1 shows measurement and control circuits in the present camera system. Specifically, it shows a circuit diagram of an automatic range finder and remote control operation decision system of the present invention.

In FIG. 1, numeral 1 denotes a controller comprising a microprocessor. The controller 1 is mounted in a camera body and includes a sequence controller for controlling operations of the camera and a remote control operation decision/control circuit of the present invention. (The controller 1 has a number of signal terminals to be connected with devices in the camera body. Those terminals will be explained later.)

Numeral 2 denotes a pull-up resistor connected to a REMOTE SELF terminal of the controller 1, numeral 3 denotes a remote self-switch for setting the camera to a remote self-timer photographing mode, numeral 4 denotes a pull-up resistor connected to a BARRIER terminal of the controller 1, numeral 5 denotes a barrier switch which is turned on or off as a lens barrier of the camera is opened or closed, numeral 6 denotes a light emitting device such as an infrared light emitting diode which forms a portion of a transmitter of an automatic range finder mounted in the camera body, numeral 7 denotes a light emitting device driver for driving the light emitting device 6 and forming a main portion of the transmitter, and numeral 8 denotes a photo-sensing device such as a PSD (semiconductor position detection device) which forms a receiver of the automatic range finder. Circuits 9-13 form major portions of the receiver and also form a range finder circuit of the automatic range finder. Numeral 9 denotes a current-voltage converter for converting a signal current generated by the photo-sensing device 8 to a voltage, numeral 10 denotes an A.C. amplifier, numeral 11 denotes an inverter, numeral 12 denotes an integrator and numeral 13 denotes a comparator (coincidence circuit).

The current-voltage converter 9 comprises an operational (OP) amplifier 9a and a feedback element 9b. An inverting terminal of the OP amplifier 9a is connected to one output terminal A of the photo-sensing device 8, and a non-inverting terminal of the OP amplifier 9a is connected to the other output terminal B of the photo-sensing device and to a reference power supply KVC. A known analog switch 14 such as an FET is arranged in a line connecting the noninverting terminal of the OP amplifier 9a and the output terminal B of the photo-sensing device 8. The analog switch 14 is turned on or off by a control signal generated at a MODE terminal of the controller 1.

The A.C. amplifier 10 connected to the current-voltage converter 9 through a D.C. blocking capacitor 15 comprises an OP amplifier 10a, a feedback resistor 10b and resistors 10c and 10d, and has an output terminal thereof connected to an input terminal of the inverter 11 and to an input terminal of the integrator 12 through a bypass line which bypasses the inverter 11. The inverter 11 connected to the A.C. amplifier 10 comprises an OP amplifier 11a, a feedback resistor 11b, an input resistor 11c and a dividing resistor 11d.

The integrator 12 comprises an OP amplifier 12a, a capacitor 12b inserted in a feedback path of the OP amplifier 12a and a resistor 12c connected to an inverting terminal of the OP amplifier 12a. The inverting terminal of the OP amplifier 12a is connected to an output terminal of the inverter 11 and an output terminal of the A.C. amplifier 10 through analog switches 16 and 17, respectively. A shunt is provided in parallel with the capacitor 12b and an analog switch 18 is arranged in the shunt. Control terminals of the analog switches 16-18 are connected to an SPL 1 terminal, an SPL 2 terminal and a SHORT terminal of the controller 1, respectively, and the analog switches are turned on and off by control signals generated at those terminals. In the present camera system, distance information is sampled a plurality of times by the analog switches 14, 16-18 in the range finder circuit, and differences between the distance information is judged by a decision circuit in the controller 1 before the self-timer is actuated.

The comparator 13 comprises an OP amplifier 13a, and an output thereof is applied to a remote control decision/control circuit in the controller 1 through a COMP terminal of the controller 1.

Numeral 19 denotes a self-timer operation indicator which comprises a self-timer indication lamp 20 and a buzzer 21 for informing the operation of the self-timer. During the operation of the self-timer, the indication lamp 20 and the buzzer 21 are driven by the circuit 19 to periodically emit light and generate alarm sound.

Numeral 22 denotes a motor for driving a film wind-up and rewind device, numeral 23 denotes a motor driver for driving the motor 22, numeral 24 a rotor coil for driving a body tube of an automatic focusing device and a shutter, numeral 25 denotes a rotor driver for driving the rotor coil 24, numeral 26 denotes an AE circuit for automatic exposure control of exposure control means, and numeral 27 denotes a photo-sensing device for exposure determination. Since, since circuits 22-27 are respectively wellknown, the explanations are eliminated in the specification.

FIG. 2 shows a timing chart of waveforms of control signals IRON, SPL 1, SPL 2, MODE and SHORT generated at the terminals of the controller 1 of FIG. 1, an output signal INTOUT of the integrator 12 and an output signal COMP of the comparator 13.

Figure 3A:
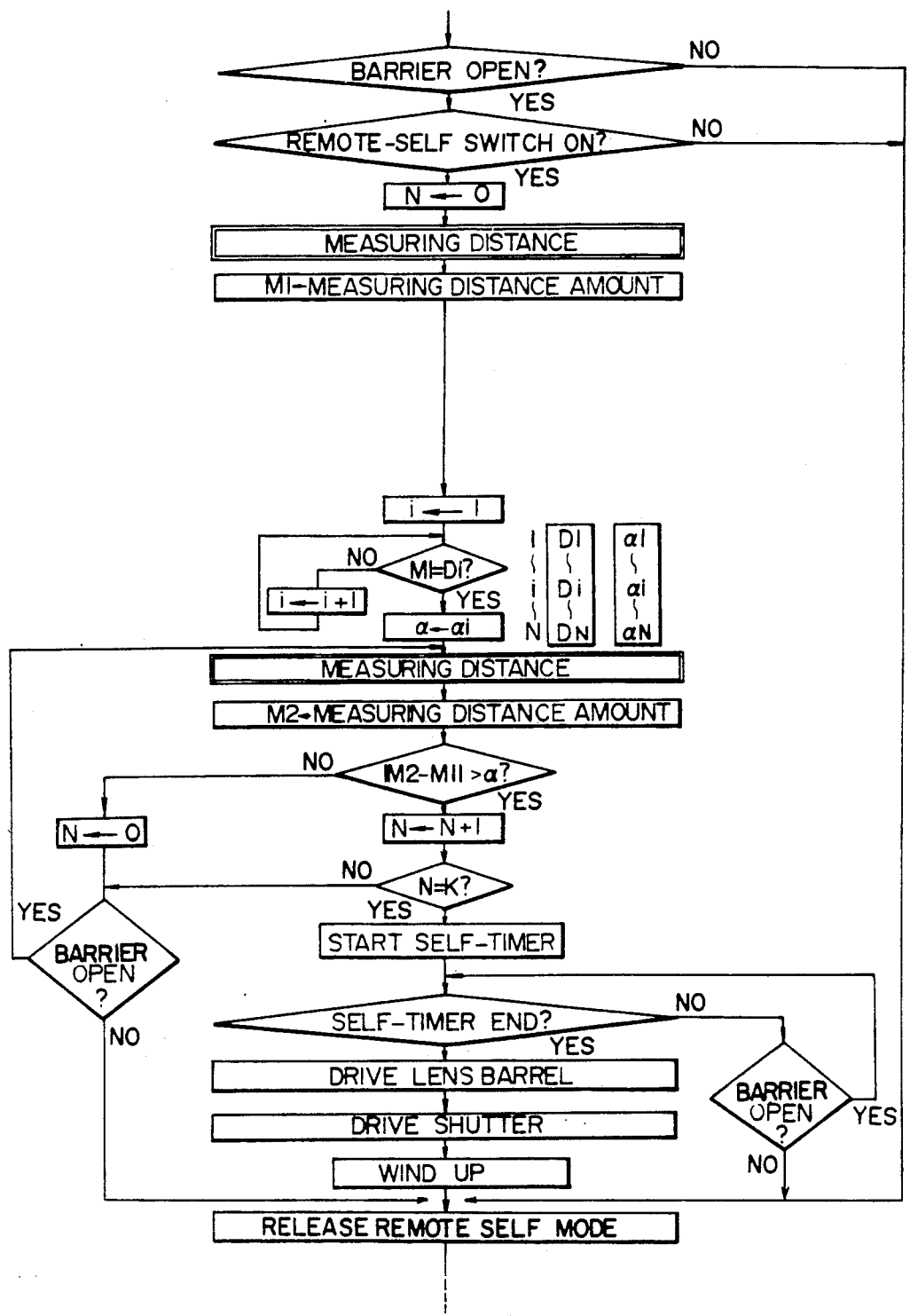
FIG. 3A shows a flow chart of a range finder sequence of the present camera system.
Figure 4:
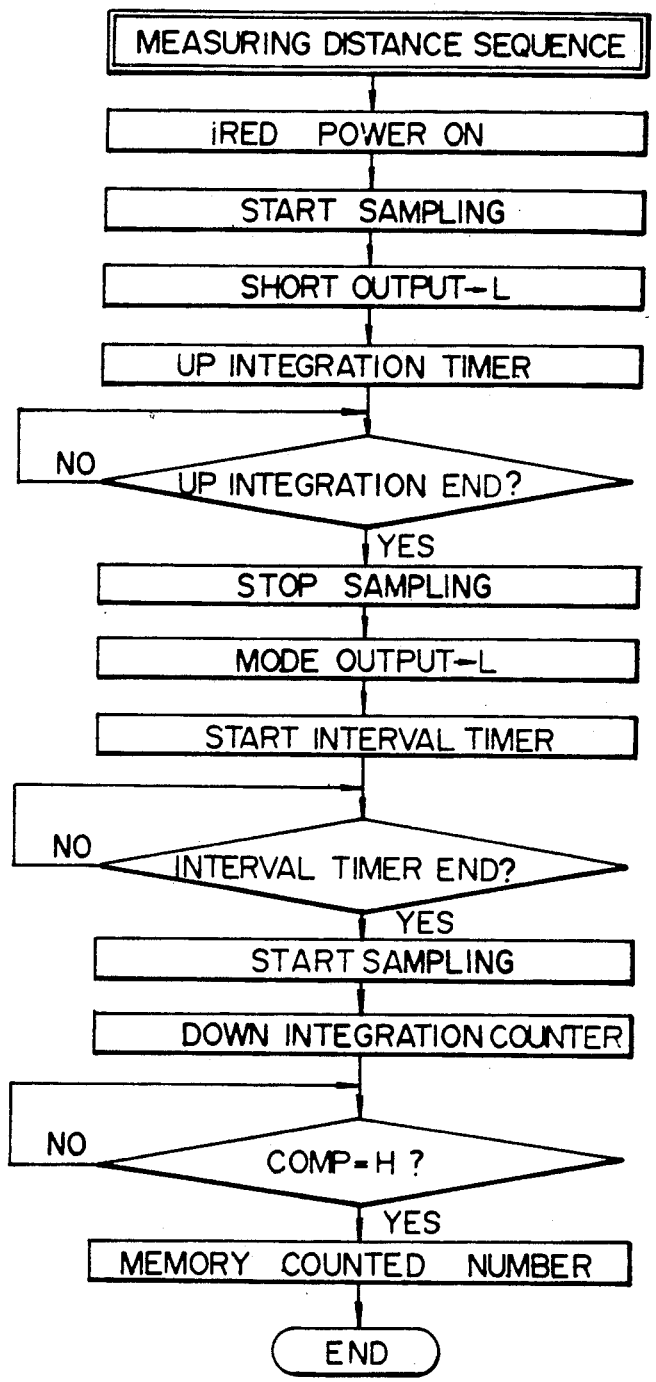
FIG. 4 shows a general flow chart of the range finder sequence in embodiments according to the present invention.

FIG. 3A shows a flow chart of a control sequence for the camera in a first embodiment of the controller 1, and FIG. 4 shows a sequence flow chart for the range finder operation shown in FIGS. 3A, B and C.

Figure 5:
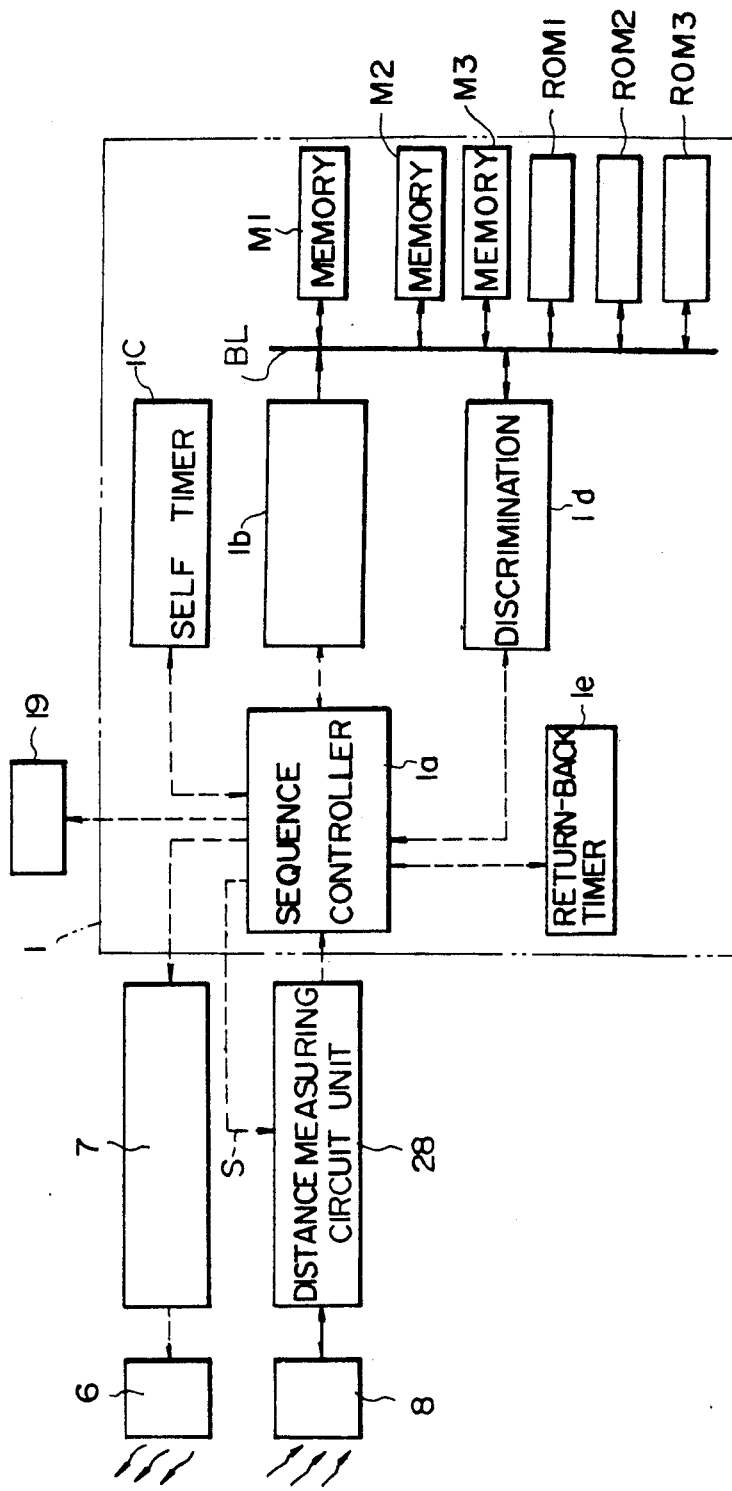
FIG. 5 shows a block diagram of a portion pertinent to the present invention.

FIG. 5 shows a block diagram for the operations carried out in the controller 1 and a major portion of the range finder circuit.

In FIG. 5, numeral 28 denotes a range finder circuit which forms a major portion of the range finder including the current-voltage converter 9 to the comparator 13 ( also including the analog switches 14 and 16-18), numeral 1a denotes a sequence controller, numeral 1b denotes a count-down counter for detecting a distance, M1, M2 and M3 denote memories for storing the distance counted in the counter 1b, ROM 1, ROM 2 and ROM 3 denote read-only memories for setting references to be compared with the distance count, BL denotes a bus line through which the distance count is transmitted, numeral 1c denotes a self-timer which is a timer means used in conventional self-timer mode photographing, numeral 1d denotes a descriminator circuit for determining whether the self-timer 1c may be actuated or not, and numeral 1e denotes a return-back timer explained hereinafter. Broken line arrows in FIG. 5 show sequence control signals, solid line arrows show data signals or processed signals and S shows a signal to turn on or off the analog switches 14 and 16-18.

Referring to FIGS. 1, 2, 3A, 4 and 5, remote control self-timer mode photographing in the first embodiment of the present camera system is explained.

A lens barrier is first opened. As a result, the barrier switch 5 is turned off and a signal level to the BARRIER terminal of the controller 1 changes to H and the photographing stand-by state is established.

When the remote self-switch 3 is turned on, the camera system enters into a distance measurement mode as shown in FIG. 3A, and the range finder sequence shown in FIG. 4 is started in the automatic range finder. The controller 1 supplies an iRON signal shown in FIG. 2 to the light emitting device driver 7 so that the light emitting device 6 emits light at a period of the iRON signal. The light from the light emitting device 6 is reflected by an object and the reflected light is sensed by the photo-sensor 8 which produces currents at the terminals A and B. Since the control signal MODE at the MODE terminal of the controller 1 for turning on or off the analog switch 14 is now H level, the analog switch 14 is now on and the currents generated in the photo-sensor 8 are supplied to the OP amplifier 9a of the current-voltage converter 9 through the terminals A and B. The current $I_A$ generated at the terminal A is represented by $$I_A = \frac{L-x}{L} \cdot I$$

where I is a total current generated in the photo-sensing device 8, L is a distance between the terminals A and B of the photo-sensor 8 and x is a distance from the terminal A of a position of an incident light. (This type of automatic range finder system employs a principle of triangulation and utilizes the fact that the position of the incident light to the photo-sensor 8 varies with the distance between the object and the camera.)

The current generated in the photo-sensor 8 is converted to a voltage by the current-voltage converter 9 and a D.C. component of the voltage is eliminated by the D.C. blocking capacitor 15, and only a signal component is applied to the A.C. amplifier 10. The output of the A.C. amplifier 10 is applied to an integrator 12 through the analog switch 16 and also to the inverter 11.

Following to the generation of the signal iRON for driving the light emitting device 6, the signals SPL 1 and SPL 2 for turning on or off the analog switches 16 and 17 are generated by the controller 1 at a period shown in FIG. 2. Accordingly, the output of the A.C. amplifier 10 and the output of the inverter 11 are sampled by the switching of the analog switches 16 and 17 and they are applied to the integrator 12. The phases of the signals SPL 1 and SPL 2 are controlled by the controller 1 such that the signal SPL 1 is H level when the light emitting device 6 emits light and the signal SPL 2 is H level when the light emitting device 6 does not emit light (see FIG. 2), for a predetermined time period.

On the other hand, in synchronism with the generation of the signals iRON, SPL 1 and SPL 2, the controller 1 generates the L-level control signal SHORT (FIG. 2) at the SHORT terminal to control the analog switch 18. Accordingly, the analog switch 18 is turned off in synchronism with the initial rise of the signal iRON and the shunt for the capacitor 12b is opened and the integrator 12 is enabled.

Accordingly, the output of the A.C. amplifier 10 and the output of the inverter 11 are alternately applied to the integrator 12 and the capacitor 12b is charged. Since the output of the A.C. amplifier and the output of the inverter 11 are sampled when they are at a lower level than the reference voltage KVC, the output INTOUT of the integrator 12 rises until a certain time point as shown in FIG. 2. Simultaneously with the start of the integration, an upintegration timer (not shown) in the controller 1 starts the operation (FIG. 4).

After a predetermined time period has elapsed, the up-integration timer in the controller 1 stops its operation (FIG. 4), and the controller 1 stops to generate the signals SPL 1 and SPL 2 (SPL 1 and SPL 2 are rendered L level) and the MODE signal is rendered L level as shown in FIG. 2. As a result, the integration operation is stopped and the output INTOUT of the integrator 12 is kept constant, and the analog switches 14, 16 and 17 are opened so that the input to the integrator 12 is stopped. On the other hand, the current input to the current-voltage converter 9 is supplied only to the inverting terminal of the OP amplifier 9a.

A predetermined time after the start of an interval timer (not shown) in the controller 1, the operation of the interval timer is stopped as shown in FIG. 4.

As the interval timer (not shown) is stopped, the controller 1 again generates the signals SPL 1 and SPL 2. The phases of those signals are different from those for the up-integration and the signal SPL 1 is H level when iRON is L level, and the signal SPL 2 is H level when iRON is H level. As a result, the output of the A.C. amplifier 10 is sampled when the light emitting device 6 does not emit light and the output of the inverter 11 is sampled when the light emitting element 6 emits light. Thus, the input voltage to the integrator 12 is negative and the charge stored in the capacitor 12b is gradually discharged. As a result, the output voltage INTOUT of the integrator 12 falls as shown in FIG. 2 to perform down-integration.

When the output INTOUT of the integrator 12 falls to the start level KVC of the integration, the comparator 13 produces an output signal (H level) as shown in FIG. 2, and a down-integration counter 1b in the controller 1 counts a time t from the start to the end of the down-integration in response to the output from the comparator. The count t is stored in a memory M1 (see FIG. 5) in the controller 1. The downintegration time t is represented by $$t = \frac{V_A}{V_A + V_B} \cdot T = \frac{L-x}{L} \cdot T$$

where T is the up-integration time, $V_A$ is a voltage corresponding to the output current from the output terminal A of the photo-sensor 8, $V_B$ is a voltage corresponding to the output current from the output terminal B of the photo-sensor 8, and L and x are the same as defined before. Accordingly, the distance to the object can be determined by counting the time t required for the down-integration.

The first distance information $t_1$ thus obtained is stored in the memory M1 through the bus line BL as shown in FIGS. 3A and 5. The first distance information is sequentially compared with various distance information prestored in the read-only memory ROM 1, and when they coincide, a value $\alpha$ corresponding to the coincident distance information in the read-only memory ROM 1 is read from the read-only memory ROM 2 (see FIG. 3A). The value $\alpha$ is larger as the first distance information is smaller, and smaller as the first distance information is larger. A second distance measurement is then carried out in the same manner and second distance information $t_2$ is produced in the down-integration counter 1b. This information is stored in the memory M2 through the bus line BL. After the second distance measurement, the first distance information $t_1$ and the second distance information $t_2$ are read from the memories M1 and M2 and an absolute value of a difference between $t_1$ and $t_2$ ($|t_2 - t_1|$) is compared with the value $\alpha$ by the descrimination circuit 1d (FIG. 5). If $|t_2 - t_1|$ is larger than $\alpha$, "1" is set in a register N, and if $|t_2 - t_1|$ is smaller than $\alpha$, the register N is reset to "0".

In a third distance measurement, an absolute value of a difference between a third distance information $t_3$ and the first distance information $t_1$ ($|t_3 - t_1|$) is compared with the value $\alpha$, and then the third distance information $t_3$ is stored into the memory M2.

The above steps are repeated, and if the absolute value of the difference between the first distance information and the $\gamma$-th distance information is larger than $\alpha$ for continuous k ($k+1 \leq \gamma$, for example, k=10) times of comparison by the decision circuit 1d, it is determined that the distance to the object has changed and the self-timer 1c in the controller 1 is actuated.

Accordingly, if a person to be photographed stretches his hand forward, the camera detects the change of the distance information and the self-timer mode photographing is automatically started. As described above, the self-timer 1c is actuated only when the absolute value of the difference between the first distance information and the subsequent distance information is larger than $\alpha$ for continuous K times of comparison. The absolute value of the difference between the first distance information and the subsequent distance information may be larger than a in view of a noise but it does not continuously occur. Accordingly, a malfunction by the noise can be prevented by the above arrangement. If no consideration need be paid for the noise (for example, $\alpha$ is sufficiently larger than noise), K may be equal to 1.

The value $\alpha$ is determined by the first distance information $t_1$ (stored in the memory M1) such that it is larger as the distance to the object is smaller, and smaller as the distance to the object is larger. Since the larger the distance to the object is, the wider is the range of object field depth, the range finder of the camera usually detects the roughly as the distance to the object increases. Since the present embodiment uses such a range finder, the change of distance information is hard to detect when a person to be photographed is at a distant point. The present invention compensates this by the setting of $\alpha$ in the manner described above. If there is no need for such consideration, the value $\alpha$ may be constant.

If the lens barrier is closed during the repetitive distance measurement the remote self-switch 3 is opened to deactivate the remote self mode.

When the self-timer 1c is actuated, a signal is supplied from the SELFD terminal of the controller 1 to the self-timer operation indicator 19 so that the self-timer indication lamp 20 is periodically turned on and off and the buzzer 21 generates sound to inform to the object and the photographer that the self-timer is in operation. (If the lens barrier is closed during the operation of the self-timer, the remote mode is reset.)

When a predetermined time of the self-timer has elapsed and the operation of the self-timer terminates, a control signal corresponding to the first distance information stored in the memory M1 is applied to the rotor driver 25 from the ROTOR terminal of the controller 1 and the rotor coil 24 is excited. As a result, the body tube is driven to an in-focus position corresponding to the first distance information (reference distance information). After the body tube has been driven, the excitation to the rotor coil 24 is stopped but it is again excited in the next shutter opening operation and deexcited after a predetermined time period determined in accordance with the information from the photo-sensor 27 and the AE circuit 26.

After the shutter operation, the motor driver 23 is activated by a signal applied to the motor driver 23 from a w terminal of the controller 1 so that the motor 22 is driven to wind up the film. After the film has been wound, the controller 1 resets to its initial state and the remote self-switch 3 is turned off. Thereafter, the above series of operations are repeated each time the remote self-switch 3 is turned on.

In the first embodiment of the present camera system, the first distance measurement is done immediately after the remote self-switch 3 is turned on, and then the distance measurement is automatically repeated a plurality of times, and if the change in the distance information is detected, the self-timer is automatically started. Accordingly, in the first embodiment of the present camera system, the remote control photographing is attained without arranging the remote control device in the camera.

In the first embodiment, the self-timer is started when the distance information changes by a predetermined amount. If the photographing takes place in response to the change of the distance information, a person who has stretched his hand to change the distance information will be photographed in the stretched position. In order to prevent it, the self-timer is started in the first embodiment. No separate timer means need be provided in the present embodiment and hence the cost and space can be saved. Further, the operation state of the camera can be readily detected from a distant place by the indication lamp of the self-timer. On the other hand, if separate timer means which can set a different time than the time of the self-timer is provided, the photographing may be started in a minimum required time which is shorter than the time of the self-timer. In this case, indication means for indicating the operation state of the timer means may be provided. If required, the photographing may occur immediately when the distance information changes by the predetermined amount or a sequence operation for winding up a film by one frame may be inserted before the photograph operation.

In the present embodiment, the camera has an active automatic range finder (with the transmitter). Alternatively, a camera having a passive automatic range finder (without transmitter) may be used in the present invention.

In the present embodiment, the self-timer is started when the absolute value of the difference between the first distance information and the subsequent distance information is larger than the predetermined value $\alpha$. Alternatively, the second or subsequent distance information may be used as the reference instead of the first distance information, or other decision method may be used.

In the first embodiment of the present camera system, the camera automatically measures the distance a plurality of times in the remote self-timer photographing mode, and the photographing is automatically started if the predetermined amount of change is detected in the distance information. Accordingly, no remote control transmitter is required and no remote control receiver need be mounted in the camera. Accordingly, the present invention provides a camera system which is of higher performance than the prior art camera and smaller and lighter, more suitable to carry, has a higher operability and is remote controlled by a relatively low cost.

Figure 3B:
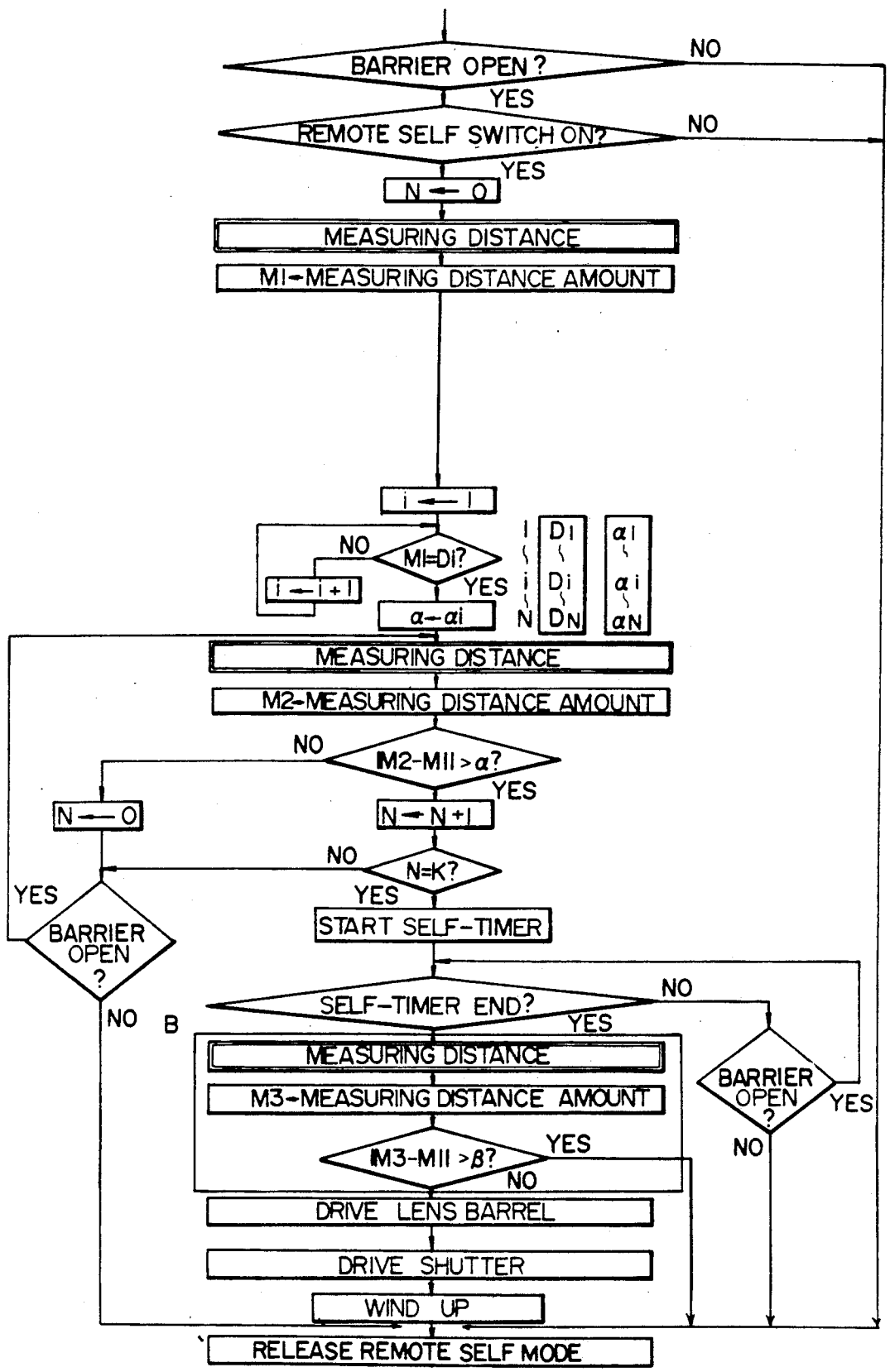
FIG. 3B shows a flow chart of the range finder sequence in another embodiment of the camera system.

Referring to FIG. 3B, a second embodiment of the present invention is explained. Except for a block B, FIG. 3B is identical to FIG. 3A and the explanation for the common portions is omitted. In FIG. 3B, when a predetermined time of the self-timer has elapsed and the self-timer operation is stopped, the controller 1 again produces the signals SPL 1 and SPL 2 to control the analog switches 16 and 17 and the distance measurement, as shown in FIG. 4, is repeated (see Block B shown in FIG. 3B). Distance information $t_3$ obtained by the distance measurement is stored into the memory M3. An absolute value of a difference between the distance information $t_1$ obtained in the first distance measurement and the distance information $t_3$ obtained in the third distance measurement ($|t_3-t_1|$) is compared with a predetermined value $\beta$ by the decision circuit $1d$ (See FIG. 5). If the absolute value is not larger, it is determined that no change has occurred in the condition of the object and the controller 1 applies a control signal to the rotor driver 25 in accordance with the distance information $t_1$ stored in the memory M1. Thus, the rotor coil 24 is excited and the rotor is driven so that the body tube is driven to an in-focus position.

The value $\beta$ is, as explained in the value o determined by the distance information $t_1$ obtained immediately after the actuation of the remote self-switch 3 and the value 8 is read out from ROM3 (See FIG. 5). It is small as the distance to the object is large, and large as the distance to the object is small.

After the body tube has been driven, the excitation to the rotor coil 24 is stopped, but it is again excited by the next shutter operation and the shutter is driven in accordance with the light intensity information from the photo-sensor 27 and the AE circuit 26.

After the shutter operation, a drive signal is applied from the W terminal of the controller 1 to the motor driver 23 so that the motor 22 is driven to wind up the film.

However, if the absolute value of the difference between the distance information $t_1$ in the memory M1 (first distance information) and the distance information $t_3$ in the memory M3 (distance information obtained after the first self-timer operation) is larger than $\beta$, the releasing is not carried out (that is, no drive signal is applied to the rotor driver 25 from the controller 1) and the remote mode is reset.

In the second embodiment of the present camera system, the releasing is not carried out if the distance information $t_3$ obtained after the self-timer operation is significantly larger than the first distance information $t_1$ obtained immediately after the actuation of the remote self-switch ($|t_3-t_1|>\beta$). The present camera system prevents waste photographing. In the control system in which the self-timer is started when the absolute value of the difference between the distance information $t_2$ and $t_1$ ($|t_2-t_1|$) is larger than $\alpha$, the releasing is carried out when, for example, a passenger intersects the camera, and waste photographing takes place. In the second embodiment of the present camera system, such releasing is prevented.

In the second embodiment, the self-timer is started when the distance information has changed. The present invention is also applicable to a camera in which a release button is depressed by an operator to start the self-timer.

FIG. 3C shows a third embodiment of the present camera system. FIG. 3C is identical to FIG. 3A except for a block C, and the explanation for the common portions is omitted. In FIG. 3C, in the chart shown in FIG. 3A, that is, after the film has been wound up, the remote self-switch 3 is not automatically reset by a signal from the motor driver 23 but the remote self mode is maintained, and the returnback le is again actuated. When the return back timer le times out, the controller 1 supplies to the range finder circuit 28 a data sampling signal S to turn on the analog switches 14 and 16–18. As a result, the automatic range finder operation is again started.

Because of the arrangement described above, the remote self-switch 3 is not automatically reset after the film has been wound up but the return back timer is started so that the automatic range finder operation is started again after the predetermined time to enable the remote self-timer photographing. The present invention may be applied to a system in which normal photographing instead of self-timer photographing is repeatedly carried out.

In the third embodiment of the present camera system, the continuous remote photographing is attained without using the known wireless remote control.

In the third embodiment, since there is an interval time between the end of first photographing and the next operation, photographing may be stopped during such time if desired.

As stated above, in a camera system according to the present invention, the size becomes small and the operability is improved and the cost becomes cheap and various points are improved so that the effectivity becomes very high.

In the above embodiments, the exposure operation is activated when distance measured changes. However when the distance measured changes, the operation to be actuated may be other operation rather than the exposure operation. For example, a flash device may be activated in response to the change of the distance measured.

I claim:

1. A camera comprising:
    distance measuring means for automatically and repeatedly measuring the distance to an object;
    discriminating means for comparing the measured results with one another to discriminate a change, and for providing an activation signal when the change exceeds a predetermined amount; and
    exposure control means for performing an exposure operation in response to said activation signal.

2. A camera according to claim 1, wherein said discriminating means comprises counter means for counting the number of changes of the measured results which exceed the predetermined amount, said activation signal being provided when the changes are continuously counted over a predetermined number.

3. A camera according to claim 2, wherein said discriminating means comprises memory means for storing an initially measured result, to compare said stored value with the measured results obtained thereafter.

4. A camera according to claim 2, wherein said exposure control means includes timer means for opening a shutter after a predetermined time period measured from reception of said activation signal.

5. A camera according to claim 4, wherein said timer means comprises self-timer means for self-timer photography.

6. A camera according to claim 2, wherein said discriminating means comprises means for changing said predetermined amount so that said predetermined amount decreases a said measured results increase.

7. A camera according to claim 2 wherein said discriminating means comprises means for changing said predetermined amount.

8. A camera according to claim 1, wherein said discriminating means comprises memory means for storing a first one of the measured results, to compare the stored value with a measured result obtained thereafter.

9. A camera according to claim 8, wherein said exposure control means includes timer means for opening a shutter after a predetermined time period measured from reception of said activation signal.

10. A camera according to claim 9, wherein said timer means comprises self-timer means for self-timer photography.

11. A camera according to claim 8, wherein said discriminating means comprises means for changing said predetermined amount so that said predetermined amount decreases as said measured results increase.

12. A camera according to claim 8 wherein said discriminating means comprises means for changing said predetermined amount.

13. A camera according to claim 2, wherein said exposure control means includes timer means for opening a shutter after a predetermined time period measured from reception of said activation signal.

14. A camera according to claim 13, wherein said timer means comprises self-timer means for self-timer photography.

15. A camera according to claim 13, wherein said discriminating means comprises means for changing said predetermined amount so that said predetermined amount decreases as said measured results increase.

16. A camera according to claim 13, wherein said discriminating means comprises means for changing said predetermined amount.

17. A camera according to claim 1, wherein said discriminating means comprises means for changing said predetermined amount so that said predetermined amount decreases as said measured results increase.

18. A camera according to claim 1 further comprising first switch means for activating said exposure operation in response to said activation signal.

19. A camera according to claim 18 further comprising second switch means for prohibiting the exposure operation started by said activation signal when an optical system protection means is in a protecting position.

20. A camera according to claim 1 further comprising switch means for prohibiting said exposure operation in response to said activation signal by interlocking with optical system protection means.

21. A camera according to claim 1 further comprising informing means for providing a signal which indicates that said exposure operation is going to be executed in response to said activation signal.

22. A camera according to claim 1 wherein said discriminating means comprises means for changing said predetermined amount.

23. A camera according to claim 2, wherein said discriminating means comprises counter means for counting the number of changes of the measured results which exceed the predetermined amount, said activation signal being provided when the changes are counted over a predetermined number.

24. A camera according to claim 2, wherein said discriminating means comprises memory means for storing the measured results, to compare the stored value with a measured result obtained thereafter.

25. A camera comprising:
distance measuring means for repeatedly measuring the distance to an object;
timer means for measuring a predetermined time;
memory means for storing a measured result obtained by said distance measuring means before said timer means measures the predetermined time;
discriminating means for comparing said measured result with a measured result obtained by said distance measuring means in response to the completion of said predetermined time to discriminate a change in the measured results, and for providing an activation signal when the change does not exceed a predetermined amount; and
exposure control means for performing an exposure operation in response to said activation signal.

26. A camera according to claim 25 wherein said discriminating means comprises means for changing said predetermined amount.

27. A camera according to claim 25, wherein said discriminating means comprises means for changing said predetermined amount so that said predetermined amount decreases as said measured results increase.

28. A camera comprising:
distance measuring means for automatically and repeatedly measuring a distance to an object;
discriminating means for comparing said measured results with one another to discriminate a change and for providing an activation signal in response to the change of said measured results;
exposure control means for performing an exposure operation in response to said activation signal;
sequential means for sequentially performing closed loop operation between said distance measuring means, said discriminating means and said exposure control means; and
timer means for setting a dead time period in said closed loop operation after every completion of one photograph operation.

29. A camera comprising:
distance measuring means for automatically and repeatedly measuring the distance to an object;
discriminating means for comparing the measured results with one another to discriminate a change, and for providing an activation signal when the change exceeds a predetermined amount; and
operation means for operating said camera in response to said activation signal.

30. A camera according to claim 27, wherein said discriminating means comprises counter means for counting the number of changes of the measured results which exceed the predetermined amount, said activation signal being provided when the changes are counted over a predetermined number.

31. A camera according to claim 29, wherein said discriminating means comprises memory means for storing the measured results, to compare the stored value with a measured result obtained thereafter.

32. A camera comprising:
distance measuring means for repeatedly measuring the distance to an object;
timer means for measuring a predetermined time;
memory means for storing a measured result obtained by said distance measuring means before said timer means measures the predetermined time;
discriminating means for comparing said measured result with a measured result obtained by said distance measuring means in response to the completion of said predetermined time to discriminate a change in the measured results, and for providing an activation signal when the change does not exceed a predetermined amount; and
operation means for operating said camera in response to said activation signal.

33. A camera comprising:
distance measuring means for automatically and repeatedly measuring a distance to an object;

discriminating means for comparing the measured results with one another to discriminate a change and for providing an activation signal in response to the change of said measured results;

operation means for operating said camera in response to said activation signal;

sequential means for sequentially performing closed loop operation among said distance measuring means, said discriminating means and said operation means; and timer means for setting a dead time period in said closed loop operation after every completion of one photograph operation.

34. A camera according to claim 33, wherein said discriminating means comprises memory means for storing the measured results, to compare the stored value with a measured result obtained thereafter.

35. A control device for a camera, comprising:

distance measuring means for automatically and repeatedly measuring the distance to an object;

discriminating means for comparing the measured results with one another to discriminate a change, and for providing an activation signal when the change exceeds a predetermined amount; and exposure control means for performing an exposure operation in response to said activation signal.

36. A control device for a camera according to claim 35, wherein said discriminating means comprises counter means for counting the number of changes of the measured results which exceed the predetermined amount, said activation signal being provided when the changes are continuously counted over a predetermined number.

37. A control device for a camera according to claim 36, wherein said discriminating means comprises memory means for storing an initially measured result, to compare said stored value with the measured results obtained thereafter.

38. A control device for a camera according to claim 36, wherein said exposure control means includes timer means for opening a shutter after a predetermined time period measured from repetition of said activation signal.

39. A control device for a camera according to claim 38, wherein said timer means comprises self-timer means for self-timer photography.

40. A control device for a camera according to claim 36, wherein said discriminating means comprises means for changing said predetermined amount so that said predetermined amount decreases as said measured results increase.

41. A control device for a camera according to claim 36 wherein said discriminating means comprises means for changing said predetermined amount.

42. A control device for a camera according to claim 35, wherein said discriminating means comprises memory means for storing a first one of the measured results, to compare the stored value with a measured result obtained thereafter.

43. A control device for a camera according to claim 42, wherein said exposure control means includes timer means for opening a shutter after a predetermined time period measured from reception of said activation signal.

44. A control device for a camera according to claim 43, wherein said timer means comprises self-timer means for self-timer photography.

45. A control device for a camera according to claim 42, wherein said discriminating means comprises means for changing said predetermined amount so that said predetermined amount decreases as said measured results increase.

46. A control device for a camera according to claim 42 wherein said discriminating means comprises means for changing said predetermined amount.

47. A control device for a camera according to claim 35, wherein said exposure control means includes timer means for opening a shutter after a predetermined timer period measured from reception of said activation signal.

48. A control device for a camera according to claim 47, wherein said timer means comprises self-timer means for self-timer photography.

49. A control device for a camera according to claim 47, wherein said discriminating means comprises means for changing said predetermined amount so that said predetermined amount decreases as said measured results increase.

50. A control device for a camera according to claim 47 wherein said discriminating means comprises means for changing said predetermined amount.

51. A control device for a camera according to claim 35, wherein said discriminating means comprises means for changing said predetermined amount so that said predetermined amount decreases as said measured results increase.

52. A control device for a camera according to claim 35 further comprising first switch means for activating said exposure operation in response to said activation signal.

53. A control device for a camera according to claim 52 further comprising second switch means for prohibiting said exposure operation in response to said activation signal by interlocking with an optical system protection means.

54. A control device for a camera according to claim 35 further comprising switch means for prohibiting said exposure operation in response to said activation signal by interlocking with optical system protection means.

55. A control device for a camera according to claim 35 further comprising informing means for providing a signal which indicates that said exposure operation is going to be executed in response to said activation signal.

56. A control device for a camera according to claim 35 wherein said discriminating means comprises means for changing said predetermined amount.

57. A camera according to claim 35, wherein said discriminating means comprises counter means for counting the number of changes of the measured results which exceed the predetermined amount, said activation signal being provided when the changes are counted over a predetermined number.

58. A control device for a camera, comprising:

distance measuring means for repeatedly measuring the distance to an object;

timer means for measuring a predetermined time;

memory means for storing a measured result obtained by said distance measuring means before said timer means measures the predetermined time;

discriminating means for comparing said measured result with a measured result obtained by said distance measuring means in response to the completion of said predetermined time to discriminate a change in the measured results, and for providing an activation signal when the change does not exceed a predetermined amount; and exposure control means for performing an exposure operation in response to said activation signal.

59. A control device for a camera according to claim 58 wherein said discriminating means comprises means for changing said predetermined amount.

60. A control device for a camera according to claim 58 wherein said discriminating means comprises means for changing said predetermined amount so that said predetermined amount decreases as said measured results increase.

61. A control device for a camera, comprising:

distance measuring means for automatically and repeatedly measuring a distance to an object;

discriminating means for comparing the measured results with one another to discriminate a change, and for providing an activation signal in response to the change of said measured results;

exposure control means for performing an exposure operation in response to said activation signal;

sequential means for sequentially performing closed loop operation among said distance measuring means, said discriminating means and said exposure control means; and timer means for setting a dead time period in said closed loop operation after every completion of one photograph operation.

62. A control device for a camera comprising:

distance measuring means for automatically and repeatedly measuring the distance to an object;

discriminating means for comparing the measured results with one another to discriminate a change, and for providing an activation signal when the change exceeds a predetermined amount; and operation means for operating said camera in response to said activation signal.

63. A camera according to claim 62, wherein said discriminating means comprises counter means for counting the number of changes of the measured results which exceed the predetermined amount, said activation signal being provided when the changes are counted over a predetermined number.

64. A camera according to claim 62, wherein said discriminating means comprises memory means for storing the measured results, to compare the stored value with a measured result obtained thereafter.

65. A control device for a camera comprising:

distance measuring means for repeatedly measuring the distance to an object;

timer means for measuring a predetermined time;

memory means for storing a measured result obtained by said distance measuring means before said timer means measures the predetermined time;

discriminating means for comparing said measured result with a measured result obtained by said distance measuring means in response to the completion of said predetermined time to discriminate a change in the measured results, and for providing an activation signal when the change does not exceed a predetermined amount; and operation means for operating said camera in response to said activation signal.

66. A control device for a camera comprising:

distance measuring means for automatically and repeatedly measuring a distance to an object;

discriminating means for comparing the measured results with one another to discriminate a change and for providing an activation signal in response to the change of said measured results;

operation means for operating said camera in response to said activation signal;

sequential means for sequentially performing closed loop operation between said distance measuring means, said discriminating means and said operation means; and timer means for setting a dead time period in said closed loop operation after every completion of one photograph operation.

* * * * *

UNITED STATES PATENT AND TRADEMARK OFFICE
CERTIFICATE OF CORRECTION

PATENT NO. : 5,047,793

DATED : September 10, 1991

INVENTOR(S) : YASUHIKO SHIOMI

It is certified that error appears in the above-identified patent and that said Letters Patent is hereby corrected as shown below: Title page, <u>At [56] References Cited</u>:

U.S. PATENT DOCUMENTS

"4,636,054  4/1987  Saegusa ..... 354/432" should be deleted; and

"62-86337  4/1987  Japan" should be deleted.

COLUMN 1:

Line 5, "continuation-in-part" should read --continuation--; and

Line 23, "performancy." should read --performance.--.

COLUMN 2:

Line 10, "some one" should read --someone--; and
Line 12, "occurence" should read --occurrence--.

COLUMN 4:

Line 11, "Since, since" should read --Since--;
Line 12, "wellknown," should read --well-known--; and
Line 39, "discriminator" should read --discrimination--.

UNITED STATES PATENT AND TRADEMARK OFFICE
CERTIFICATE OF CORRECTION

PATENT NO. : 5,047,793
DATED : September 10, 1991
INVENTOR(S) : YASUHIKO SHIOMI

It is certified that error appears in the above-identified patent and that said Letters Patent is hereby corrected as shown below:

COLUMN 5:

Line 50, "upintegration" should read --up-integration--.

COLUMN 6:

Line 21, "downintegration" should read --down-integration--.

COLUMN 7:

Line 13, "than a" should read --than $\alpha$--;
    Line 25, "the roughly" should read --the distance roughly--; and
    Line 34, "measurement the" should read --measurement, the--.

COLUMN 9:

Line 12, "value o" should read --value $\alpha$--;
    Line 15, "value 8" should read --value $\beta$--;
    Line 46, "passenger" should read --passerby--; and
    Line 63, "returnback le" should read --return-back le--.

UNITED STATES PATENT AND TRADEMARK OFFICE
CERTIFICATE OF CORRECTION

PATENT NO. : 5,047,793
DATED : September 10, 1991
INVENTOR(S) : YASUHIKO SHIOMI

It is certified that error appears in the above-identified patent and that said Letters Patent is hereby corrected as shown below:

COLUMN 10:

Line 27, "activated" should read --actuated--;
Line 49, "claim 2," should read --claim 1,--; and
Line 59, "a" should read --as--.

COLUMN 11:

Line 56, "claim 2," should read --claim 1,--.

COLUMN 12:

Line 40, "claim 27," should read --claim 29,--.

COLUMN 14:

Line 11, "timer" should read --time--.

Signed and Sealed this

Eleventh Day of May, 1993

Attest:

MICHAEL K. KIRK

Attesting Officer

Acting Commissioner of Patents and Trademarks